June 24, 1958 W. B. WATKINS, JR 2,840,684
COMBINATION FRYING PAN AND GRIDDLE AND METHOD
OF HEATING THE OPERATIVE SURFACE THEREOF
Filed June 10, 1955 2 Sheets-Sheet 1

INVENTOR.
William B. Watkins, Jr.
BY
H. Thrall Brewer
Attorney

June 24, 1958 W. B. WATKINS, JR 2,840,684
COMBINATION FRYING PAN AND GRIDDLE AND METHOD
OF HEATING THE OPERATIVE SURFACE THEREOF
Filed June 10, 1955 2 Sheets-Sheet 2
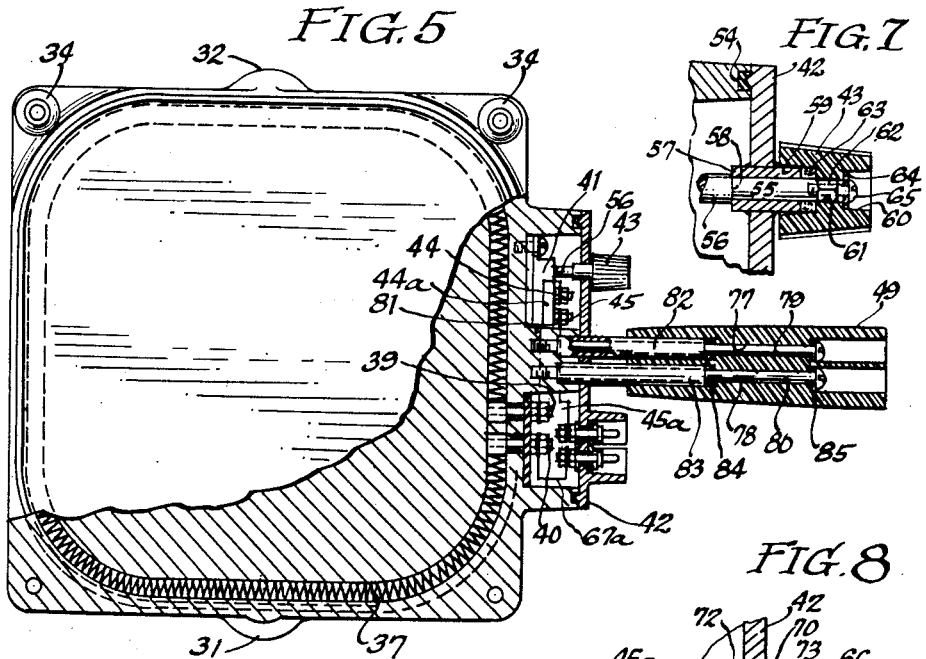
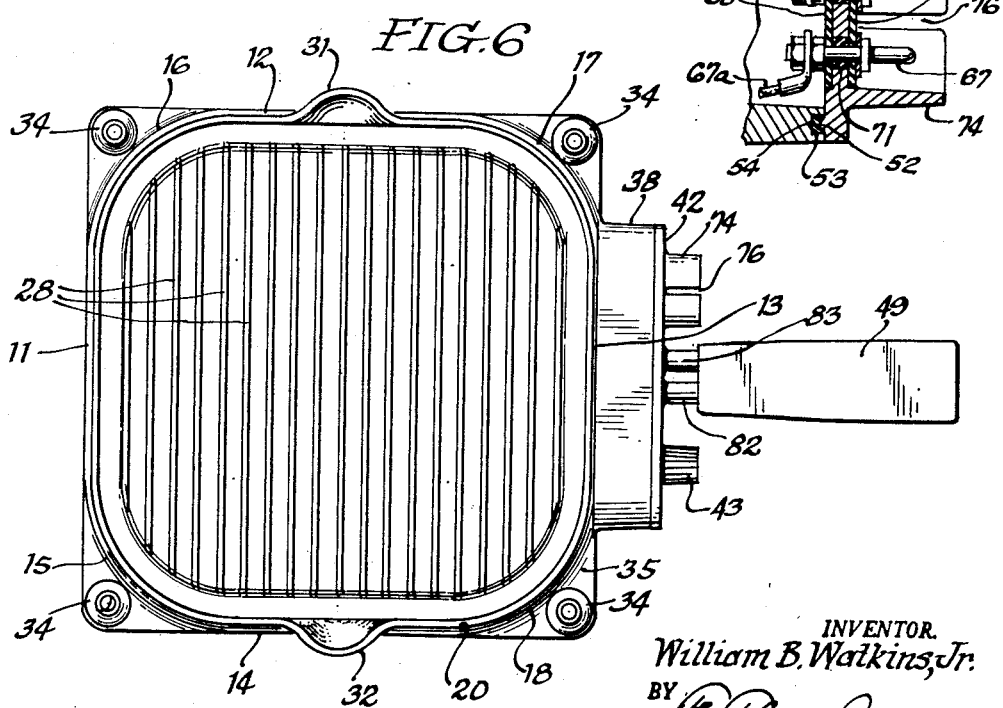
INVENTOR.
William B. Watkins, Jr.
BY
Attorney

United States Patent Office 2,840,684
Patented June 24, 1958

2,840,684

COMBINATION FRYING PAN AND GRIDDLE AND METHOD OF HEATING THE OPERATIVE SURFACE THEREOF

William B. Watkins, Jr., Lake Geneva, Wis.

Application June 10, 1955, Serial No. 514,494

8 Claims. (Cl. 219—44)

This invention relates to a combination frying pan or skillet and grill, and to a method of heating the operative surface thereof.

For purposes of economy and convenience in storage and transportation, it may be desirable to combine in a utensil as many cooking functions as possible. This is particularly true where the utensil is designed to be portable and may on occasion be used away from home as, for example, in a summer cottage or other temporary residence. Two such functions can be conveniently designed into one utensil provided that they are of such nature that they are rarely called into use in the preparation of the same meal. Each function may require different heating conditions, as well as the presence or absence of water, deep fat, light coating of grease, etc., and hence, if the utensil is used for one function, such as frying, it cannot simultaneously be used for another function such as baking or broiling.

It is an object of this invention to provide a cooking utensil of unitary structural form having provisions for performing two or more cooking functions, with common heating means for all such functions.

It is another object of this invention to provide a dual-cooking-function utensil having a portion which may be used exclusively for performing one of the cooking functions and another portion which may be used exclusively to perform the other of said functions.

A further object of this invention is to provide a dual-cooking-function utensil having a portion thereof adapted to be used exclusively for each of said functions, the total area encompassed by the utensil being substantially equal to the area of one of said portions thereby effecting an economy of space required to store the utensil.

A more specific object of this invention is the provision of a dual-cooking-function utensil wherein said utensil is reversible so that its upper surface may be used to perform one cooking function and its bottom surface may be used to perform another cooking function, the rims of both the top and bottom being substantially identical and being adapted to receive a common cover.

In prior designs of frying pans and grills heated electrically it has been common practice to embed the electrical heating unit into the bottom of the pan or grill in a pattern which locates most of the heating element in the center of the utensil. Since little or no liquid is used in a frying or baking process the heat is conducted directly from the bottom of the utensil to the food being cooked. With the heating coils disposed directly under the food and controlled by an on-off thermostat, very rapid changes in temperature occurred and hot spots in the bottom of the utensil corresponding to the configuration of the heating element were unavoidable. This, of course, led to uneven cooking, with a correspondingly inferior cooked product.

A further object of this invention, accordingly, is the provision of a method of heating a cooking utensil adapted to be used to cook food substantially without the presence of a liquid, wherein the heat is applied to the utensil at a place removed from the food so that the food does not rest over the point of application of heat to the utensil, and then conducting the heat in a uniform manner to the portion of the utensil which is in direct contact with the food.

As a more specific object, this invention seeks to provide a method of cooking food substantially without the presence of liquid, which consists in the steps of heating a solid mass encircling, and disposed at a distance from, the food to be cooked, and then conducting the heat from the said mass through a relatively thin food supporting plate or wall to the food.

A feature of this invention is the provision of a heated mass constituting the sides of a frying pan or grill, with legs disposed exteriorly of the mass for supporting the mass from a table, counter or the like.

These and other objects and features of this invention will become apparent from the following detailed description when taken together with the accompanying drawings in which:

Fig. 5 is a plan view, partly in section, of the utensil of Fig. 1 with the cover removed;

Fig. 6 is a bottom plan view of the utensil of Fig. 1; and

Figs. 7 and 8 are enlarged views, in section, of fragments of Fig. 5.

Figure 1:
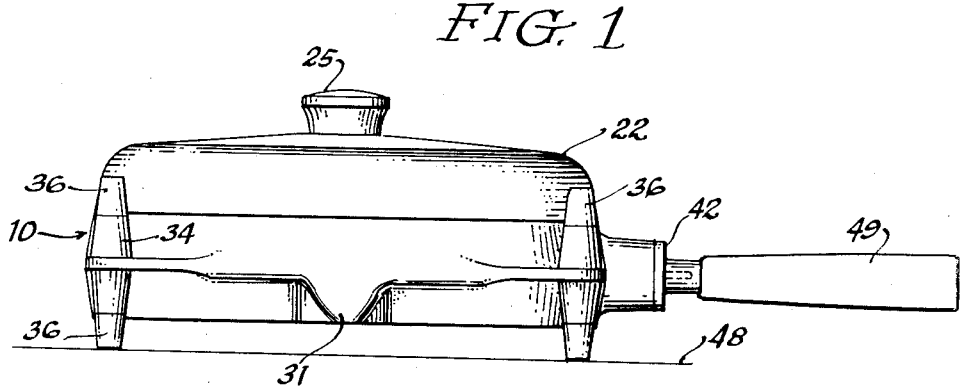
Fig. 1 is a side elevational view of a combined frying pan and grill incorporating the features of this invention.
Figure 2:
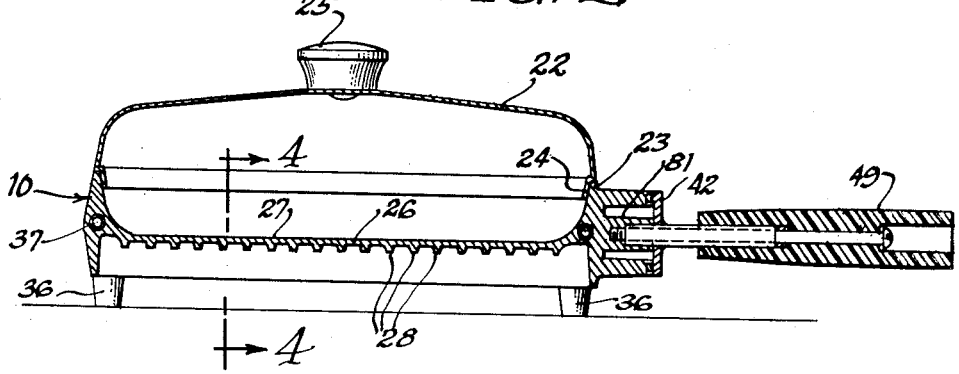
Fig. 2 is a side elevational view corresponding to Fig. 1, in section, however, to show the construction of the principal parts thereof.
Figure 4:
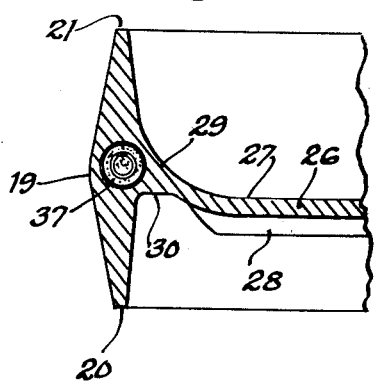
Fig. 4 is an enlarged fragmentary side elevational view in section showing the construction of the portion of the utensil in which the heat is generated.

In the preferred embodiment of the invention depicted in the accompanying drawings, the utensil includes a metallic heat-conducting mass 10 in the form of a generally rectangular band having sides 11, 12, 13 and 14 connected by well rounded corners 15, 16, 17 and 18. The band is preferably, though not necessarily, thickest at its central region 19 (Fig. 4) and is tapered in section toward its edges 20 and 21. In the form chosen to illustrate this invention, edge 21 forms the rim of the frying pan portion of the utensil and edge 20 forms a rim of the grill portion thereof. Said rims are substantially identical and are adapted to support a cover 22 (Fig. 2) having a shoulder 23 by which it is seated on one or the other of the rims 20 and 21, and an inwardly depending flange 24 which retains the cover in place on the selected rim. A knob 25 is provided at the center of cover 22 by which the latter may be raised from, or placed upon, edges 20, 21.

The interior regions of band 10 are connected by a relatively thin wall 26 (Fig. 2) having a smooth surface 27 on one side defining the bottom of the frying pan portion of the utensil, and having further a plurality of ribs 28 of any desired configuration such as the parallel form shown in Fig. 6 extending outwardly from the surface of wall 26 opposite surface 27. Said ribs 28 form the bottom or food-supporting surface for the grill portion of the utensil when the latter is inverted.

Band 10 and wall 26 are preferably formed as a single casting, all surfaces accordingly being formed to provide the requisite draft for easy removal of the casting from a mold. In addition to the uniform taper provided in band 10 from the central region 19 thereof to edges 20 and 21, a well-rounded fillet 29 is formed between wall 26 and the band. Wall 26 may be disposed equidistantly from edges 20 and 21, but I prefer to dispose wall 26 closer to edge 20 than to edge 21, thereby resulting in a relatively deep frying section and a relatively shallow grill section. Inasmuch as the frying section is adapted to be used for food requiring an appreciable depth of cooking fat, and whereas the grill section is adapted to be used substantially dry, the asymmetrical arrangement of wall 26 relative to edges 20 and 21 satisfies the optimum requirements of both the frying section and the grill section of the utensil. Furthermore, such offset arrangement of wall 26, together with the reverse side of fillet 29, results in a peripheral trough 30 in the grill section into which grease from the grilled food, such as bacon or the like, may drain and from which it may be subsequently emptied through pouring lips 31 or 32 disposed in sides 12 and 14, respectively, and formed in edge 20.

The utensil may be supported from a table top 48 or the like by four legs 34 formed in webs 35 extending outwardly from the thick central region 19 of the band 10 at the corners 15, 16, 17 and 18. Said webs 35 are conveniently contoured in plan view as extensions of the sides 11, 12, 13 and 14 to continue and heighten the rectangular form of the utensil. Each leg 34 is tapered outwardly from its web 35, the degree of taper preferably being the same as that of the sides from thick central region 19. Heat insulating extensions 36 of suitable length may be secured, if desired, to legs 34 to raise the utensil from its supporting surface and thereby to prevent direct contact between the hot edges 20 or 21 and table top 48, and also to reduce the transmission of radiated heat from band 10 to said table top.

It may be apparent from the description thus far given that the utensil may be used with edge 21 uppermost, in which event the grill section is concealed and only the frying section of the utensil is available, or it may be turned over so that edge 20 is uppermost, thereby exposing the grill section, including the ribs 28 on which the food may be supported, and concealing the frying section. In either event, the utensil will be supported on heat insulating extensions 36 in spaced relation to table top 48.

In previous designs, wall 26 was made relatively thick and had embedded therein an electrical heating unit of a well-known type comprising an outer protective metallic tube, an inner heating unit centrally disposed within the tube, and heat conducting, electrically insulating, material disposed between the heating element and the tube to prevent contact between the heating element and the tube. The unit generally took the form of a spiral or sinuous grid. In such prior designs the food to be cooked was placed directly over the heating unit so that an uneven cooking of the food took place as mentioned above. Those portions of the food disposed over the spaces between adjacent heating element sections received less heat than those portions disposed directly over the heating element, with the result that portions of the food were overcooked and other portions were not cooked enough.

I have found that a very uniform heating effect can be produced in wall 26, first, by making said wall relatively thin to reduce the time required to bring it to a predetermined desired temperature and, second, by disposing the heating unit around the perimeter of said wall 26. By this method heat is generated in the peripheral regions of wall 26 and then is conducted uniformly through said wall to the central regions thereof. Assuming a uniform thickness of the wall 26, disregarding for the moment the ribs 28, all portions of the wall will be uniformly heated and consequently all portions of the food placed thereon will be cooked uniformly. The presence of ribs 28 will not materially alter the uniformity of the heat conduction from the peripheral heating units, provided such ribs are substantially equally spaced from one another across the operative surface of the grill portion of the utensil.

In the present design, the heating unit 37 may be of standard tubular form, the tube having been bent to conform to the rectangular shape of the thick central region 19 and conveniently embedded therein by casting the utensil around the heating unit. In this manner, the thickened central region becomes an ideal location of the heating unit.

Figure 3:
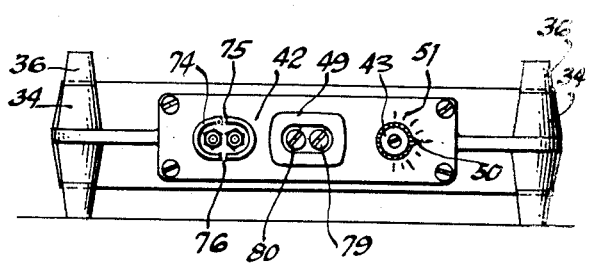
Fig. 3 is an end elevational view of the utensil of Fig. 1.

Side 13 is preferably cast in such manner as to form a box 38 which is integral with thick central region 19 and is utilized to house the terminals 39 and 40 of heating unit 37, and a temperature regulating thermostat 41. A plate 42 may be secured across the open end of box 38 to conceal the thermostat as well as the electrical connections from the terminals 39 and 40 to the thermostat and to the exterior of the utensil. The thermostat 41 may be reached by a knob 43 having a pointer 50 (Fig. 3) or other index adapted to pass over a suitably graduated scale 51 imprinted upon or affixed to plate 42.

Plate 42 overlies the edges of box 38 and has a continuous bead 52 cast in the inner edge regions thereof which contacts a substantially continuous gasket 53 of heat and moisture resistant material received in a groove 54 formed in the edge of box 38.

Said knob 43 is secured to the end 55 of the control shaft 56 of thermostat 41 which passes through a guide tube 57 extending through plate 42 and welded or otherwise secured to said plate. The end 55 is of reduced diameter to form a shoulder 58 which abuts on the inner end of tube 55. Knob 43 has molded therein opposed recesses 59 and 60, connected by a square opening 61, the latter receiving the correspondingly squared end 62 of shaft 56 to provide a positive drive between knob 43 and shaft 56. Recess 59 is adapted to receive the outer end of tube 57 as well as a sealing ring 63 of moisture and heat resistant material which fits between said tube end and the bottom of recess 59, and recess 60 is adapted to receive a washer 64 and a screw 65 by which knob 43 is secured to the squared end 62 of shaft 56 and by which sealing ring 63 may be compressed between tube 57 and knob 43.

Terminal 39 is connected by a suitable wire 44a to one terminal 44 of thermostat 41, the other terminal 45 of the thermostat being connected by a wire 45a to a prong 66 extending through plate 42. A second prong 67 is connected by a wire 67a to terminal 40. Said prongs 66 and 67 may be connected through a standard plug receptacle and wire to a suitable source of ordinary 110 v. electrical energy, and are appropriately electrically insulated from one another by electrically non-conducting and heat and moisture resistant plates 68, 69 and tubes 70, 71. Nuts 72 cooperate with shoulders 73 on the prongs 66, 67 to compress the plates 68, 69 and tubes 70, 71 against the prongs and plate 42 to effect the desired moisture insulation between the interior and exterior of box 38 as well as to secure said prongs firmly to plate 42.

A guard is formed around prongs 66, 67 by molding an open-ended box 74 on the outer surface of plate 42 of a size and shape to receive a plug receptacle. Said box is preferably formed with opposed slots 75, 76 (Fig. 3) extending inwardly to the surface of plate 42, and aligned with the space between the prongs. The slots 75, 76 serve to drain box 74 of any moisture which may accumulate therein after the utensil has been washed and also provide access for a cleaning or drying cloth to the space between the prongs by which such space may be cleaned of accumulated grease or other substances which are ordinarily difficult to remove by ordinary washing processes.

The utensil may be lifted and carried about by a handle 49 provided with openings 77, 78 through which pass long screws 79, 80 which may be threaded into appropriate openings in a boss 81 molded in side 13 of the utensil. Plate 42 has secured thereto by molding therearound or by other well known means a pair of long tubes 82 and 83 which extend into counterbores in boss 81 and handle 49 and through which long screws 79 and 80 are adapted to pass. Moisture and heat resistant washers 84, 85 are applied to the end of each tube to seal the space between the tube and screw. It may be observed that the use of rigid tubes extending well into handle 49 provides a rigid connection between the handle and utensil and substantially eliminates objectionable whip when the utensil is handled.

It may be apparent from the foregoing description that the utensil of this invention not only provides dual cooking functions, thereby greatly reducing the cost normally associated with two utensils designed for those functions, and economizing as well on space required for storing such utensils, but also provides a novel method of heating the food which eliminates local overheating and underheating of adjacent regions thereof. Due to the thinness of wall 26, the transmission of heat from the heating unit to the effective cooking surfaces on either side of said wall is both rapid and uniform, thus promoting an efficient utilization of the heat generated by the unit. The unit can be made very simply as a casting to which the thermostatic control, plate prongs, legs and handle may be added by ordinary machining and assembling techniques.

It is understood that the foregoing description is merely illustrative of a preferred embodiment of this invention and that the scope of this invention therefore is not to be limited thereto but is to be determined by the appended claims.

I claim:

1. As a new article of manufacture, a cooking utensil comprising upright side walls in substantially rectangular outline and having upper and lower edges, a relatively thin bottom wall disposed in a plane located between the said upper and lower edges of the side walls, said bottom wall contacting the side walls and being supported thereby, said bottom wall dividing the utensil into a frying pan and a grill in inverted relation to one another, said side walls being of varying thickness from edge to edge, with maximum thickness occurring substantially midway between said edges, a heating unit disposed in the region of maximum thickness of the side walls and adapted to heat the bottom wall by conduction from the side walls, and means on the utensil for supporting said utensil upon a table or the like with the edges of the side walls spaced from said table.

2. A new article of manufacture as described in claim 1, said rectangular outline including broadly rounded corners, and said supporting means comprising webs extending outwardly from the rounded corners of the side walls, and legs extending from the webs beyond the edges of the side walls.

3. A new article of manufacture as described in claim 1, said rectangular outline including broadly rounded corners, and said supporting means comprising webs extending horizontally from the side walls at the broadly rounded corners and forming continuations of said side walls, and legs extending transversely from both sides of the webs beyond the edges of the side walls.

4. As a new article of manufacture, a cooking utensil comprising upright side walls, a bottom wall connecting the side walls, and an open ended box extending laterally from a side wall, a cover plate for the box, a tubular member rigidly secured to and extending through the cover plate, a boss in said box and extending thereinto from the said side wall, a handle having an opening therein to receive the tube, an abutment in the handle opening against which the tube may bear, means extending through the tube for securing the handle to the boss, means for sealing the tube relative to the handle, and means for sealing the cover plate relative to the box.

5. As a new article of manufacture, a cooking utensil comprising upright side walls, a bottom wall connecting the side walls, and an open ended box extending laterally from a side wall, a cover plate for the box, an electrical heating element for the utensil and having a pair of terminals in the box, a cover for the box, a pair of prongs extending through and electrically insulated with respect to the cover, means connecting the prongs to the terminals, and a box extending outwardly from the cover around the prongs, said box having a pair of slots extending from the open end of the second-mentioned box to the cover and aligned with the space between the prongs, whereby to provide openings for draining the second mentioned box and for access to the space between prongs.

6. As a new article of manufacture, a cooking utensil comprising upright side walls having upper and lower edges, a relatively thin transverse wall disposed in a plane located between the said upper and lower edges of the side walls, said transverse wall contacting the side walls and being supported thereby, said transverse wall dividing the utensil into a frying pan and a grill in inverted relation to one another, said side walls being of varying thickness from edge to edge, with maximum thickness occurring substantially midway between said edges, a heating unit disposed in the region of maximum thickness of the side walls and adapted to heat the transverse wall by conduction from the side walls, and means on the utensil for supporting said utensil upon a table or the like with the edges of the side walls spaced from said table.

7. A new article of manufacture as described in claim 6, said transverse wall having on one side a smooth continuous surface and a fillet joining the transverse wall to the side walls, said smooth continuous surface defining the transverse surface of the frying pan and being disposed a greater distance from the edges of the side walls defining the rim of the frying pan than from the edges of the side walls opposite thereto, thereby providing a relatively deep frying pan and a shallow grill, the opposite side of said fillet forming a continuous peripheral groove around the grill for the reception of grease, etc.

8. A new article of manufacture as described in claim 6, an open sided box formed integrally with and extending outwardly from one of said side walls, a cover for said box, said heating unit comprising an electrical resistance wire having its ends terminating in said box, a thermostat in said box in series with one of said ends, a pair of prongs extending through said cover and connected to the ends of the wire, and a handle supported by said cover and secured to a side wall.

References Cited in the file of this patent

UNITED STATES PATENTS

| 1,857,781 | Hanyzer | May 10, 1932 |
| 1,951,257 | Preston | Mar. 13, 1934 |
| 2,164,813 | Gunther | July 4, 1939 |
| 2,480,337 | Pearce | Aug. 30, 1949 |
| 2,571,782 | Swenson | Oct. 16, 1951 |
| 2,749,427 | Malz | June 5, 1956 |

FOREIGN PATENTS

| 440,813 | Great Britain | Jan. 7, 1951 |
| 664,113 | Great Britain | June 2, 1952 |